(12) United States Patent
Yokomori et al.

(10) Patent No.: US 6,863,336 B2
(45) Date of Patent: Mar. 8, 2005

(54) POWERED SLIDING DEVICE FOR VEHICLE SLIDING DOOR

(75) Inventors: Kazuhito Yokomori, Yamanashi-ken (JP); Takuya Imai, Yamanashi-ken (JP)

(73) Assignee: Mitsui Kinzoku Kogyo Kabushiki Kaisha, Tokyo (JP)

( * ) Notice: Subject to any disclaimer, the term of this patent is extended or adjusted under 35 U.S.C. 154(b) by 53 days.

(21) Appl. No.: 10/282,243

(22) Filed: Oct. 29, 2002

(65) Prior Publication Data

US 2004/0046419 A1 Mar. 11, 2004

(30) Foreign Application Priority Data

Oct. 29, 2001 (JP) .......................................... 2001-331554
Oct. 29, 2001 (JP) .......................................... 2001-331555

(51) Int. Cl.[7] .................................................. B60J 5/06
(52) U.S. Cl. ........................ 296/155; 296/146.4; 49/360
(58) Field of Search ............................. 296/155, 146.4, 296/146.1; 49/360

(56) References Cited

U.S. PATENT DOCUMENTS

| | | | |
|---|---|---|---|
| 5,140,316 A | * | 8/1992 | DeLand et al. ............. 296/155 |
| 5,144,769 A | * | 9/1992 | Koura ......................... 49/360 |
| 5,316,365 A | * | 5/1994 | Kuhlman et al. ........... 296/155 |
| 5,525,875 A | * | 6/1996 | Nakamura et al. .......... 49/280 |
| 5,833,301 A | * | 11/1998 | Watanabe et al. ............. 49/360 |
| 5,836,639 A | * | 11/1998 | Kleefeldt et al. ........... 296/155 |
| 5,913,563 A | * | 6/1999 | Watanabe et al. ........... 296/155 |
| 6,046,510 A | * | 4/2000 | Kawanobe et al. ...... 296/146.1 |
| 6,089,649 A | * | 7/2000 | Hamada et al. ............. 296/155 |
| 6,231,113 B1 | * | 5/2001 | Armbruster et al. ........ 296/155 |
| 6,270,148 B1 | * | 8/2001 | Noda et al. ................. 296/155 |
| 6,359,762 B1 | | 3/2002 | Yokomori |
| 6,776,448 B2 | * | 8/2004 | Matsui et al. ............. 296/146.4 |
| 2001/0024093 A1 | * | 9/2001 | Naganuma ................... 318/445 |
| 2003/0111864 A1 | * | 6/2003 | Fisher ..................... 296/146.1 |
| 2003/0189196 A1 | * | 10/2003 | Kita ........................... 296/155 |
| 2004/0070231 A1 | * | 4/2004 | Yogo et al. ................. 296/155 |
| 2004/0103585 A1 | * | 6/2004 | Yokomori .................... 49/360 |
| 2004/0123525 A1 | * | 7/2004 | Suzuki et al. ................ 49/360 |

* cited by examiner

*Primary Examiner*—Jason Morrow
(74) *Attorney, Agent, or Firm*—Browdy and Neimark, P.L.L.C.

(57) ABSTRACT

The present device has a wire drum connected to a sliding door through a wire cable and being rotated by the power of a motor, an electromagnetic brake which applies braking to the wire drum using a solenoid as the driving source, and a switch transistor which sends electricity to the solenoid when being turned on by a Hi signal from the output port of a controller. The interval between the solenoid and the switch transistor is connected through a line where the voltage level is raised when the switch transistor is turned off and the voltage level is lowered when the switch transistor is turned on. The line is connected through a failure detecting circuit to the input port of the controller.

2 Claims, 4 Drawing Sheets

POWERED SLIDING DEVICE FOR VEHICLE SLIDING DOOR

BACKGROUND OF THE INVENTION

1. Field of the Invention

The present invention relates to a powered sliding device for a vehicle sliding door.

2. Description of the Related Art

Conventionally, powered sliding devices for a vehicle sliding door, wherein the sliding door is slid in the door closing direction and in the door opening direction by rotating a wire drum connected to the sliding door through a wire cable by the power of a motor have been well known.

In the powered sliding devices, there is one which uses a solenoid as a part. The solenoid is used in an electromagnetic clutch for transmitting the rotation of the motor to the wire drum or an electromagnetic brake for applying braking to the wire drum. It cannot be said that the electromagnetic brake is an essential unit for the powered sliding device, but it is possible to comparatively easily improve the safety and the controllability of the sliding device by using the electromagnetic brake.

The electromagnetic clutch and electromagnetic brake cannot be operated when the wire of the solenoid is broken or the transistor for exciting the solenoid is damaged. In the case of the electromagnetic clutch, even if such a failure is caused, only the transmission of the rotation of the motor to the wire drum becomes impossible and no problem is caused in the manual door opening, and therefore, there is no trouble in the safety. However, when the electromagnetic brake is broken down, it becomes impossible to apply braking to the wire drum, and if the sliding door is slid by the motor power supposing that the electromagnetic brake can be used, the effect to the safety is produced.

Furthermore, a powered closing device wherein when the sliding door has moved in the door closing direction to a predetermined position, the latch to be engaged with the striker is rotated in the full-latch direction by the motor power, so that the sliding door is made in the full-latched state is also well known, and the powered closing device may be used together with the powered sliding device.

In the basic setting of the combination device, the sliding device takes charge of the movement from the door opening position of the sliding door to the half-latched position. Then, the closing device takes charge of the movement from the position a little before the half-latched position of the sliding door to the full-latched position. Thus, in the basic setting, between the position on this side and the half-latched position, the sliding device and the closing device are operated at the same time, and consequently, it is arranged that the sliding door moved by the sliding device can surely be passed to the closing device.

The first problem of the basic setting is that the sliding device and the closing device operate at the same time. When both devices operate at the same time, a large load is applied to the battery to cause sudden dropping of the voltage, and the operation of the sliding device and the closing device becomes unstable. Therefore, previously, the use of the strengthened electric system has become essential, and it has been inevitable for the device to be large-sized.

Furthermore, the second problem of the basic setting is that it is necessary to always move the sliding door to the half-latched position by the sliding device. In order to move the sliding door to the half-latched position, an unexpectedly strong force is necessary because of the effect of the reaction of the weather strip or the like. Therefore, the sliding device is also made large-sized.

SUMMARY OF THE INVENTION

Accordingly, it is an object of the present invention to provide a circuit by which the inspection of the electromagnetic brake of the powered sliding device can be performed before moving the sliding door.

Furthermore, it is another object of the present invention to provide a small-sized combination device including a powered sliding device and a powered closing device.

In the combination device of the present invention, the sliding device takes charge of the movement from the door opening position of the sliding door to the succeeding point a little before the half-latched position, and the closing device takes charge of the movement from the succeeding point of the sliding door to the full-latched position.

DESCRIPTION OF THE PREFERRED EMBODIMENT

Figure 1:
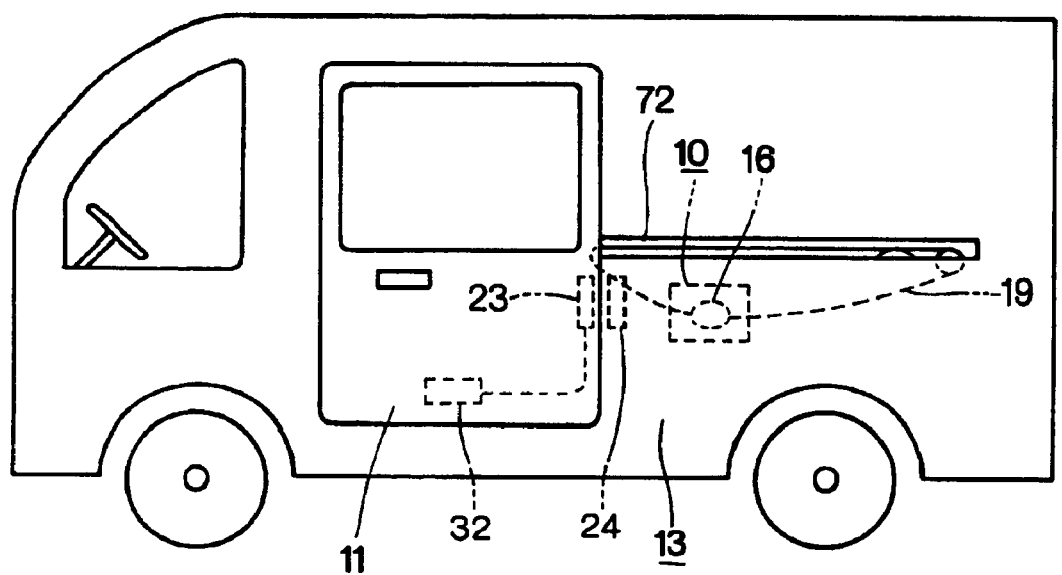
FIG. 1 is a side view of a vehicle with a powered sliding device and a sliding door.
Figure 2:
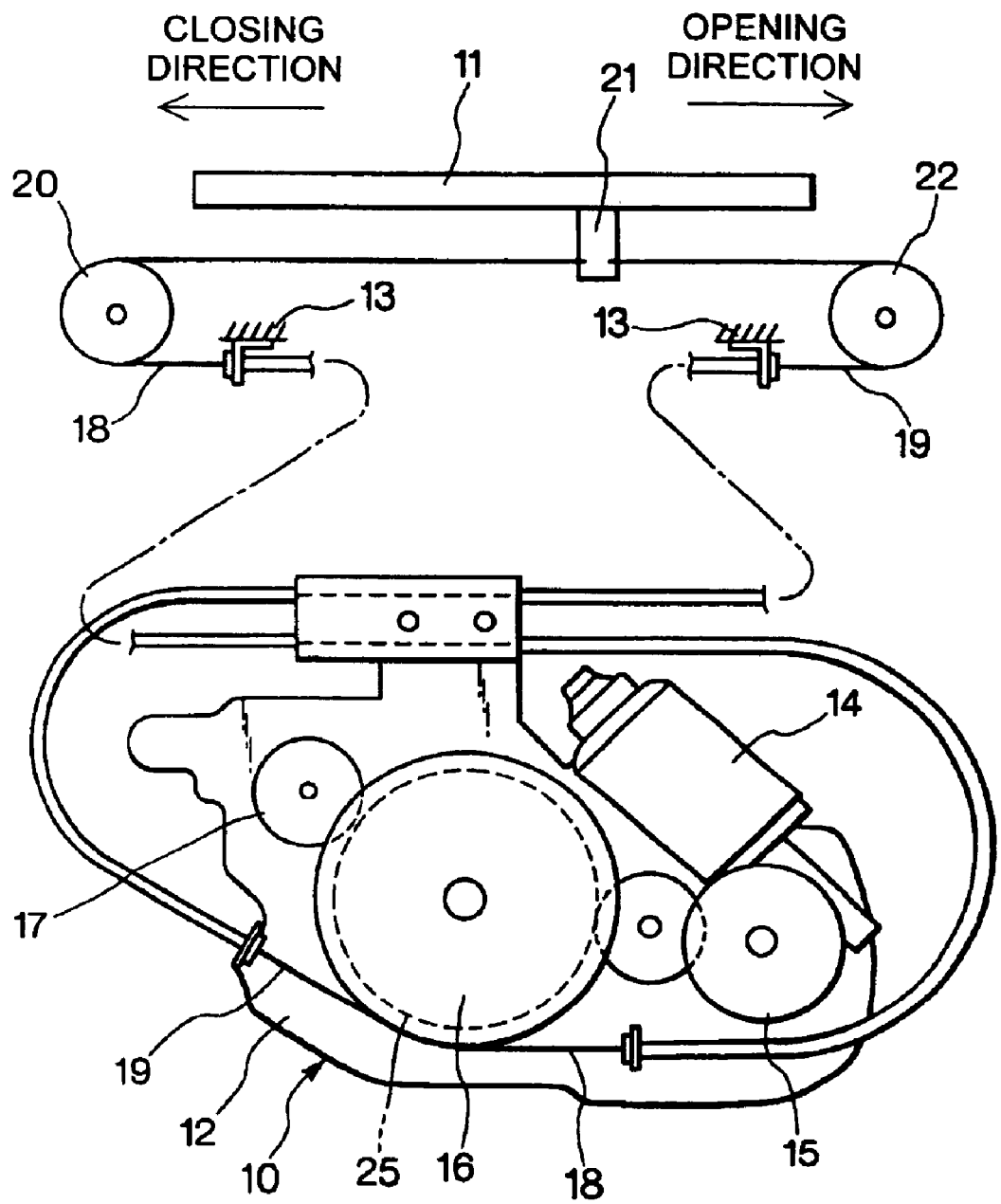
FIG. 2 is an expanded view of the sliding device and the sliding door.

One embodiment of the present invention will be described by using drawings. FIG. 1 shows the rough relation between a powered sliding device 10 according to the present invention and a vehicle sliding door 11 which slides in the door closing direction and in the door opening direction by the powered sliding device 10. FIG. 2 shows the expanded relation between the two.

The sliding door 11 is slidably attached to a vehicle body 13, and slides in the back and forth direction of the vehicle body 13 along a guide rail 72 provided to the vehicle body 13. A base plate 12 of the powered sliding device 10 is fixed to the vehicle body 13, and to the base plate 12, a motor 14, a reduction mechanism 15, a wire drum 16, and an electromagnetic brake 17 are provided. The electromagnetic brake 17 is operated by the electric control and applies braking to the wire drum 16.

To the wire drum 16, one end sides of two wire cables 18, 19 are connected. The other end side of the first wire cable 18 is connected to a bracket 21 of the sliding door 11 through a front pulley 20 pivoted to the vehicle body 13. Similarly, the other end side of the second wire cable 19 is connected to the bracket 21 through a rear pulley 22 pivoted to the vehicle body 13.

Between the reduction mechanism 15 and the wire drum 16, a clutch mechanism 25 is provided, and the rotation of the motor 14 is transmitted to the wire drum 16 through the reduction mechanism 15 and the clutch mechanism 25. The structure of the clutch mechanism 25 is free. For example, an electromagnetic clutch which can be switched to the connected state and the disconnected state between the motor 14 and the wire drum 16, or a clutch which is switched to the connected state when the motor 14 rotates and which is switched to the disconnected state when the motor 14 stops, or a clutch which is switched to the connected state by the rotation of the motor 14 but which can keep the connected state even if the motor 14 is stopped, or the like can be used (refer to U.S. Pat. No. 6,359,762).

When the wire drum 16 rotates clockwise by the power of the motor 14, the first wire cable 18 is wound up and at the same time, the second wire cable 19 is pulled out, and the sliding door 11 slides in the door closing direction, and by the counterclockwise rotation of the wire drum 16, the second wire cable 19 is wound up and at the same time, the first wire cable 18 is pulled out, and the sliding door 11 slides in the door opening direction.

Figure 3:
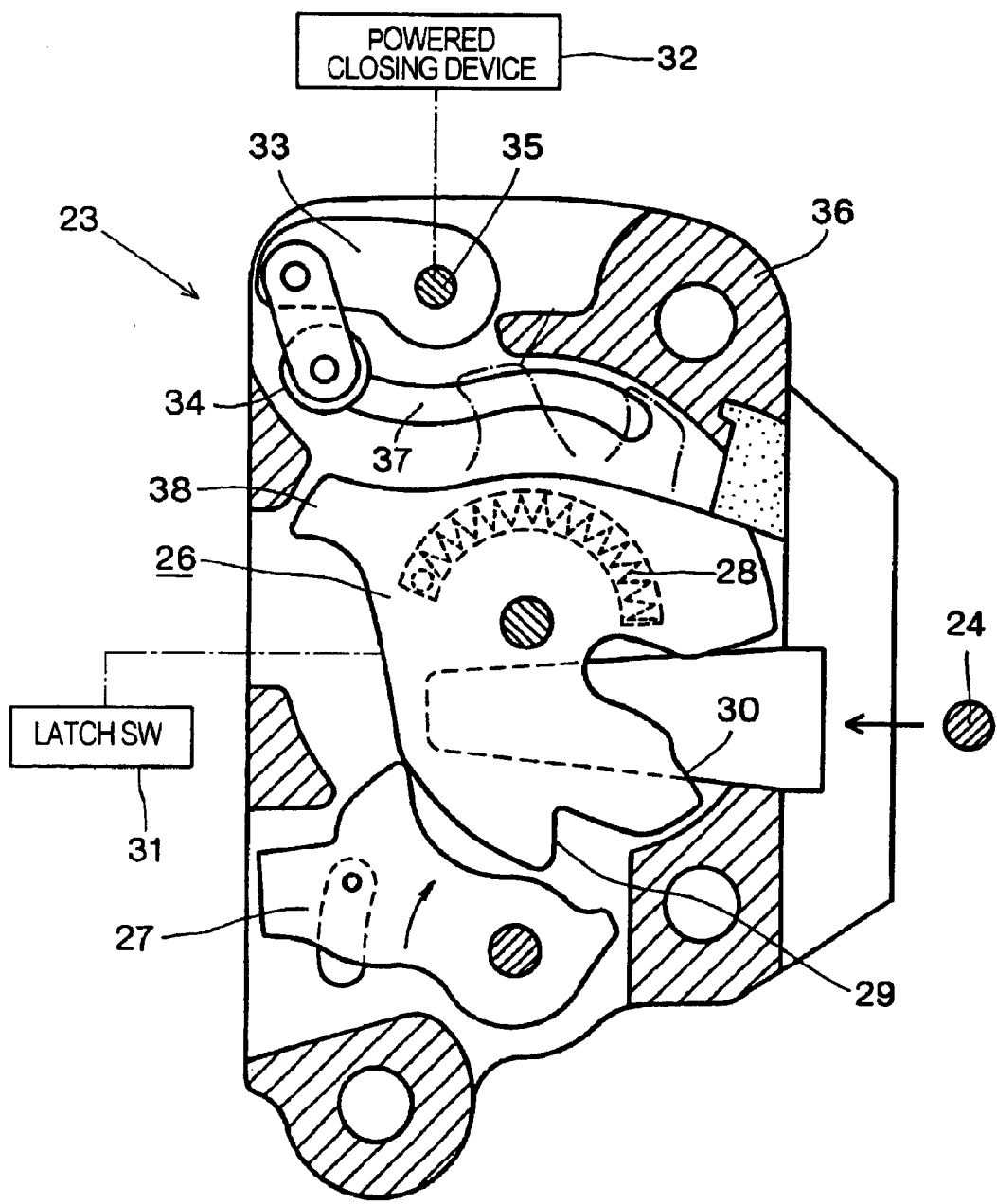
FIG. 3 is a cross sectional view of a latch assembly.

To the sliding door 11, a latch assembly 23 for keeping the sliding door 11 at the door closing position is attached. To a latch body 36 of the latch assembly 23, as shown in FIG. 3, a latch 26 to be engaged with a striker 24 fixed to the vehicle body 13, and a ratchet 27 to be engaged with the latch 26 are pivoted. The latch 26 is urged in the counterclockwise direction by the elasticity of a latch spring 28, and the ratchet 27 is urged in the clockwise direction by the elasticity of a ratchet spring (not shown). When the sliding door 11 moves in the door closing direction, the latch 26 comes into contact with the striker 24, and rotates from the door opening position (unlatched-position) which is shown by the solid line through the half-latched position where the ratchet 27 is engaged with the half-latch step part 29 of the latch 26 to the full-latched position shown by the dotted line where the ratchet 27 is engaged with the full-latch step part 30 of the latch 26. When the latch 26 becomes in the full-latched position and the ratchet 27 is engaged with the full-latch step part 30, the sliding door 11 is completely closed.

The latch assembly 23 has a latch switch 31 for detecting the position of the latch 26. The latch switch 31 is turned on when the latch 26 is engaged with the striker 24 by the movement of the sliding door 11 in the door closing direction and rotates from the unlatched-position to a predetermined position (hereafter, referred to as the succeeding point). The timing of ON of the latch switch 31 is the moment when the latch 26 is initially engaged with the striker 24, and the moment before the latch 26 becomes in the half-latched position.

The latch assembly 23 has a motor type powered closing device 32 which operates when the latch switch 31 is turned on, and the output of the powered closing device 32 is transferred to a driving lever 33. To the driving lever 33, a pressing part 34 is attached, and when the driving lever 33 rotates counterclockwise about a support shaft 35 by the power of the closing device 32, the pressing part 34 moves to the right along a guide groove 37 in the latch body 36. At the moment when the closing device 32 is actuated, the latch 26 is at the succeeding-point where the latch 26 is initially engaged with the striker 24, and therefore, the pressing part 34 moved to the right comes into contact with a latch leg part 38 of the latch 26 and rotates the latch 26 to the full-latched position by the power of the closing device 32, and completely closes the sliding door 11.

Figure 4:
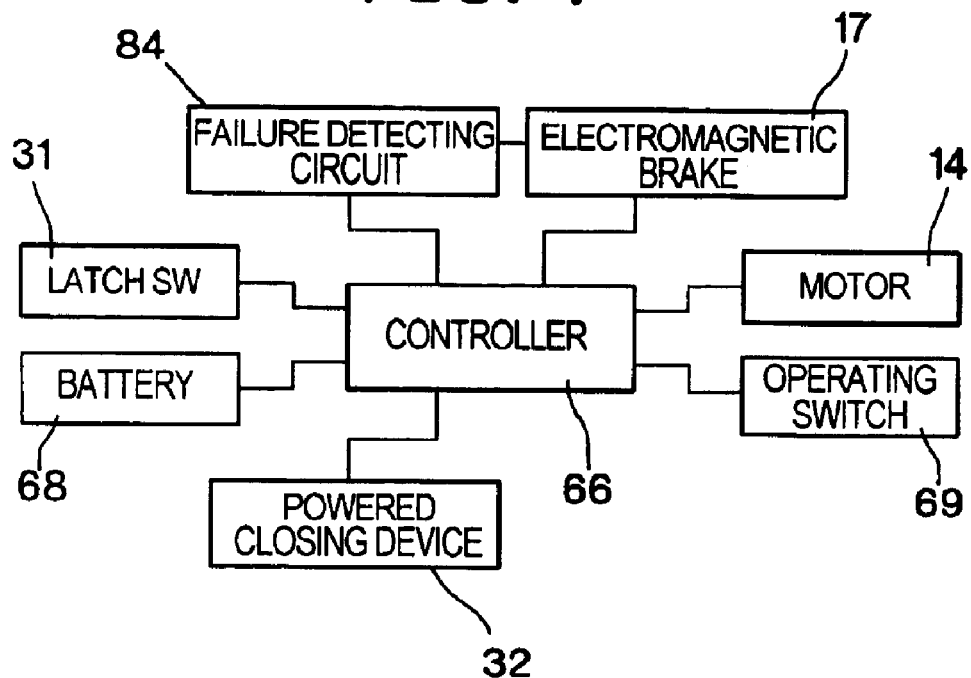
FIG. 4 is a block diagram for performing the control operation of the present invention.

FIG. 4 is a block diagram for performing the control operation according to the present invention. The block diagram has a controller 66, a battery 68, an operating switch 69, and a failure detecting circuit 84 of the electromagnetic brake 17.

Figure 5:
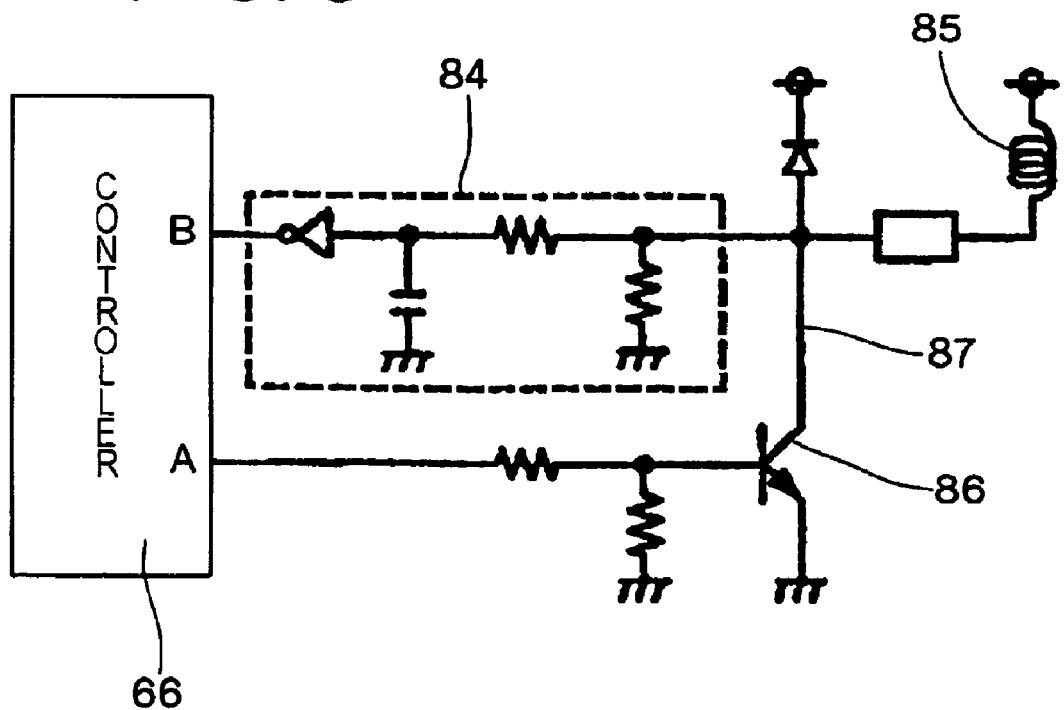
FIG. 5 is a block diagram showing a failure detecting circuit.

FIG. 5 shows a power circuit of the electromagnetic brake 17, and the power circuit has a solenoid 85 of the electromagnetic brake 17, and a switch transistor 86. When the controller 66 outputs the High signal from the output port A, the switch transistor 86 is turned on, and the electricity is sent from the battery 68 to the solenoid 85, and the electromagnetic brake 17 is operated. The input port B of the controller 66 is connected to a line 87 reaching the collector of the switch transistor 86 from the ground side of the solenoid 85, through the failure detecting circuit 84. Originally, the failure detecting circuit 84 is a circuit for transmitting the voltage level of the line 87 to the input port B, and in this meaning, a mere line is also sufficient, but in the embodiment, it is made to be a circuit wherein the electromotive force at the time of ON of the switch transistor 86 or the outward noise signal is not transmitted to the input port B of the controller 66.

Operations

When the operating switch 69 is operated to the door closing side, the door closing operation is performed by the controller 66, and by the motor 14 of the powered sliding device 10, the wire drum 16 is rotated in the door closing direction, and the sliding door 11 slides in the door closing direction, and when the sliding door 11 reaches the succeeding point before the half-latched position, the latch 26 of the sliding door 11 is initially brought into contact with the striker 24 and the latch switch 31 is turned on.

If the latch switch 31 is turned on, the door closing sliding of the sliding door 11 by the motor 14 of the powered sliding device 10 is stopped. Therefore, it is unnecessary for the powered sliding device 10 to make the sliding door 11 in the half-latched state, and therefore, it can be made small-sized and cheap when compared with that in the prior art.

By turning-on of the latch switch 31, the electromagnetic brake 17 is operated, and braking is applied to the wire drum 16 to restrict the sliding movement of the sliding door 11. Consequently, the sliding door 11 is not returned in the door opening direction by the effect of the reaction of the weather strip or the like and is kept at the succeeding point.

Furthermore, by turning-on of the latch switch 31, the powered closing device 32 is started. Thus, the closing device 32 starts after the stop of the sliding device 10, and therefore, the load of the battery is reduced when compared with the prior art.

By the start of the powered closing device 32, the driving lever 33 rotates about the support shaft 35 and the pressing part 34 moves to the right along the guide groove 37, and the pressing part 34 comes into contact with the leg part 38 of the latch 26 initially engaged with the striker 24 when about 0.5 second has passed since turning-on of the latch switch 31. When the time necessary for the pressing part 34 to come into contact with the leg part 38 of the latch 26 has passed, the electromagnetic brake 17 is turned off, and the restriction of the sliding door 11 is canceled. Consequently, after that, by the pressing part 34 moved by the power of the powered closing device 32, the latch 26 rotates to the full-latched position, and the sliding door 11 is completely closed.

The time necessary for the pressing part 34 to come into contact with the leg part 38 of the latch 26 depends on the battery voltage, and therefore, it is preferable to change the time of turning-on of the electromagnetic brake 17 according to the battery voltage.

The solenoid 85 of the electromagnetic brake 17 is operated when the switch transistor 86 is turned on by the High signal from the output port A of the controller 66, and when the switch transistor 86 is turned off by the Low signal from the output port A, it stops. Then, if the switch transistor 86 is turned off, the voltage of the battery 68 is applied to the input port B of the controller 66 connected through the failure detecting circuit 84 to the line 87 reaching the switch transistor 86 from the ground side of the solenoid 85, and therefore, the High signal is inputted (Furthermore, in the failure detecting circuit 84, a logical inversion element is provided, and therefore, actually, the Low signal is inputted, but in the present specification, the description is given supposing that the logical inversion is out of the consideration). On the contrary, when the wire of the solenoid 85 is broken, the voltage of the battery 68 is not transmitted to the line 87, and therefore, the Low signal is inputted to the input port B. Accordingly, when the output port A of the controller 66 is at the Low level, the following is clear.

| output port A | Input port B | Result |
|---|---|---|
| Low signal | High signal | Normal |
| Low signal | Low signal | Breaking of wire of solenoid 85 |

When the controller 66 sends out the High signal from the output port A and turns on the switch transistor 86 to send the electricity to the solenoid 85, the voltage level of the line 87 suddenly drops by the turning-on of the switch transistor 86. Therefore, to the input port B of the controller 66, the Low signal is inputted through the failure detecting circuit 84. On the contrary, when the switch transistor 86 is broken, even if the controller 66 send out the High signal from the output port A, the voltage drop does not appear in the line 87, and therefore, the High signal is inputted to the input port B. Accordingly, when the output port A of the controller 66 is at the High level, the following is clear.

| output port A | Input port B | Result |
|---|---|---|
| High signal | Low signal | Normal |
| High signal | High signal | Failure of transistor 86 |

Thus, according to the present invention, it is possible to separately detect each of the breaking of the solenoid 85 and the breaking of the switch transistor 86 by the existence of the command signal from the controller 66 for operating the solenoid 85, and when such breaking is detected, it is arranged that the controller 66 does not perform the sliding control even if the operating switch 69 is operated.

Furthermore, the breaking detection of the solenoid 85 can always be monitored even when the powered sliding device 10 is waiting, but the breaking detection of the transistor 86 cannot be performed when the operation signal is not actually outputted to the solenoid 85. Therefore, when the powered sliding device 10 is waiting, an operating signal as a necessary test is outputted, or after the operating switch 69 has been operated, an operating signal as a test is outputted, and it is arranged that if the normality is confirmed, the sliding control is performed, and when the failure of either the solenoid 85 or the transistor 86 is detected, the performing of the sliding control supposing that the electromagnetic brake 17 can be used is previously canceled.

Advantage

As mentioned above, in the present invention, it is possible to separately detect the normality and abnormality of each of the solenoid 85 and the switch transistor 86 by the combination of the signal level from the output port A and the voltage level inputted to the input port B.

Furthermore, according to the control method of the present invention, the power necessary for the powered sliding device 10 is decreased, and therefore, the downsizing and the cost down of the device becomes possible, and furthermore, it becomes possible to avoid the simultaneous use of the powered sliding device 10 and the powered closing device 32, and therefore the load of the electric system is also decreased.

What is claimed is:

1. A powered sliding device for a vehicle sliding door, comprising:

a vehicle sliding door slidably attached to a vehicle body;

a wire drum connected to the sliding door through a wire cable and arranged to be rotated by power of a motor;

a clutch mechanism for transmitting the power of the motor to the wire drum;

an electromagnetic brake arranged to apply braking to the wire drum using a solenoid as driving source;

a controller for controlling the motor and the electromagnetic brake;

a battery; and a switch transistor arranged to be turned on by a Hi signal from an output port of the controller and to be turned off by a Lo signal from the output port, said switch transistor sending electricity to the solenoid when being turned on;

wherein an interval between the solenoid and the switch transistor is connected through a line where the voltage level is raised when the switch transistor is turned off and is lowered when the switch transistor is turned on;

wherein the way of the line is connected through a failure detecting circuit to an input port of the controller;

wherein it is arranged that normality and abnormality of each of the solenoid and the switch transistor can separately be detected by the combination of a signal from the output port and a voltage level inputted to the input port.

2. A control method of a powered sliding device for a vehicle sliding door, comprising the steps of:

sliding a sliding door in a door closing direction by power of a motor of a powered sliding device;

stopping a motor-powered sliding movement in the door closing direction of the sliding door and operating an electromagnetic brake to restrict the sliding movement of the sliding door when a latch switch is turned on by an initial contact between a striker and a latch of the sliding door in accordance with the sliding movement of the door up to a succeeding point before a half-latched position;

furthermore starting a powered closing device for rotating the latch toward a full-latched position when the latch switch is turned on;

canceling restriction of the sliding door by the electromagnetic brake after the elapse of a predetermined time.

* * * * *